(12) United States Patent
Dahlman et al.

(10) Patent No.: US 6,173,162 B1
(45) Date of Patent: Jan. 9, 2001

(54) MULTIPLE CODE CHANNEL POWER CONTROL IN A RADIO COMMUNICATION SYSTEM

(75) Inventors: Erik Dahlman; Johan Lundsjö, both of Tranebergsvägen; Mathias Johansson, Skälbyvägen, all of (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 08/874,907

(22) Filed: Jun. 16, 1997

(51) Int. Cl.⁷ ...................................................... H04B 1/00
(52) U.S. Cl. .................. 455/69; 455/69; 455/522
(58) Field of Search ............... 455/69, 522, 434, 455/515, 88, 572

(56) References Cited

U.S. PATENT DOCUMENTS

| | | | |
|---|---|---|---|
| 5,345,598 | 9/1994 | Dent | 455/54.1 |
| 5,383,219 | 1/1995 | Wheatley, III et al. | 375/1 |
| 5,455,967 * | 10/1995 | Amezawa | 455/69 |
| 5,485,486 * | 1/1996 | Gilhousen et al. | 375/205 |
| 5,603,096 | 2/1997 | Gilhousen et al. | 455/69 |
| 5,604,730 | 2/1997 | Tiedemann, Jr. | 370/252 |
| 5,619,525 * | 4/1997 | Wiedeman et al. | 375/205 |
| 5,710,982 * | 1/1998 | Laborde et al. | 455/69 |
| 5,713,074 * | 1/1998 | Hulbert | 455/69 |
| 5,828,947 * | 10/1998 | Michel et al. | 455/13.4 |

FOREIGN PATENT DOCUMENTS

| | | |
|---|---|---|
| 548939 | 6/1993 | (EP) . |
| 682419 | 11/1995 | (EP) . |

OTHER PUBLICATIONS

European Standard Search Report re RS 99715 Date of completion of search: Jan. 20, 1998.

* cited by examiner

*Primary Examiner*—Daniel S. Hunter
*Assistant Examiner*—Darnell P. Armstrong
(74) *Attorney, Agent, or Firm*—Burns, Doane, Swecker & Mathis, L.L.P.

(57) ABSTRACT

Methods of controlling the power levels of transmitted signals in telecommunication systems are described. A user may be assigned a plurality of radio bearers associated with a plurality of physical channels for communicating with a radiocommunication system. A fast power control loop monitors a reference channel and adjusts transmit power in accordance with an SIR target value. A plurality of slow power control loops adjust the SIR target value and also provide offset transmit power values associated with each physical channel to adapt the transmit powers in accordance with varying quality requirements between radio bearers.

17 Claims, 8 Drawing Sheets

MULTIPLE CODE CHANNEL POWER CONTROL IN A RADIO COMMUNICATION SYSTEM

BACKGROUND

This invention relates to the control of power levels of transmitted signals in telecommunication systems, in particular spread spectrum systems.

Good transmit power control methods can be important to communication systems having many simultaneous transmitters because such methods reduce the mutual interference of such transmitters. For example, transmit power control is necessary to obtain high system capacity in interference limited communication systems, e.g., those that use code division multiple access (CDMA). Depending upon the system characteristics, power control in such systems can be important for the uplink (i.e., for transmissions from a remote terminal to the network), the downlink, (i.e., for transmissions from the network to the remote terminal) or both.

In a typical CDMA system, an information data stream to be transmitted is superimposed on a much-higher-bit-rate data stream produced by a pseudorandom code generator. The information signal and the pseudorandom signal are typically combined by multiplication in a process sometimes called coding or spreading the information signal. Each information signal is allocated a unique spreading code. A plurality of coded information signals are transmitted as modulations of radio frequency carrier waves and are jointly received as a composite signal at a receiver. Each of the coded signals overlaps all of the other coded signals, as well as noise-related signals, in both frequency and time. By correlating the composite signal with one of the unique spreading codes, the corresponding information signal can be isolated and decoded.

The need for transmit power control in the uplink is recognized in current CDMA cellular systems, as may be seen from "Mobile Station-Base Station Compatibility Standard for Dual-Mode Wideband Spread Spectrum Cellular System", TIA/EIA Interim Standard TIA/EIA/IS-95 (Jul. 1993) and its revision TIA/EIA Interim Standard TIA/EIA/IS-95-A (May 1995). Such standards that determine the features of U.S. cellular communication systems are promulgated by the Telecommunications Industry Association and the Electronic Industries Association located in Arlington, Va.

Uplink power control according to the IS-95-A standard is provided by, among other techniques, a closed-loop method in which a base station measures the strength of a signal received from a remote station (e.g., relative to its associated noise) and then transmits one power control bit to the remote station every 1.25 milliseconds. Based on the power control bit, the remote station increases or decreases its transmit (uplink) power by a predetermined amount. According to Sections 6.1.2.3.2 and 7.1.3.1.7 of the standard, a "zero" power control bit causes the remote station to increase its transmit power level by 1 dB and a "one" power control bit causes the remote station to decrease its transmit power level by 1 dB. The IS-95-A standard also addresses uplink power control in other situations, such as when a remote station accesses the system (before the closed-loop power control method is active), using an open loop power control technique wherein the remote station gradually increases its transmit power level until the network responds to its access attempts.

Figure 1A:
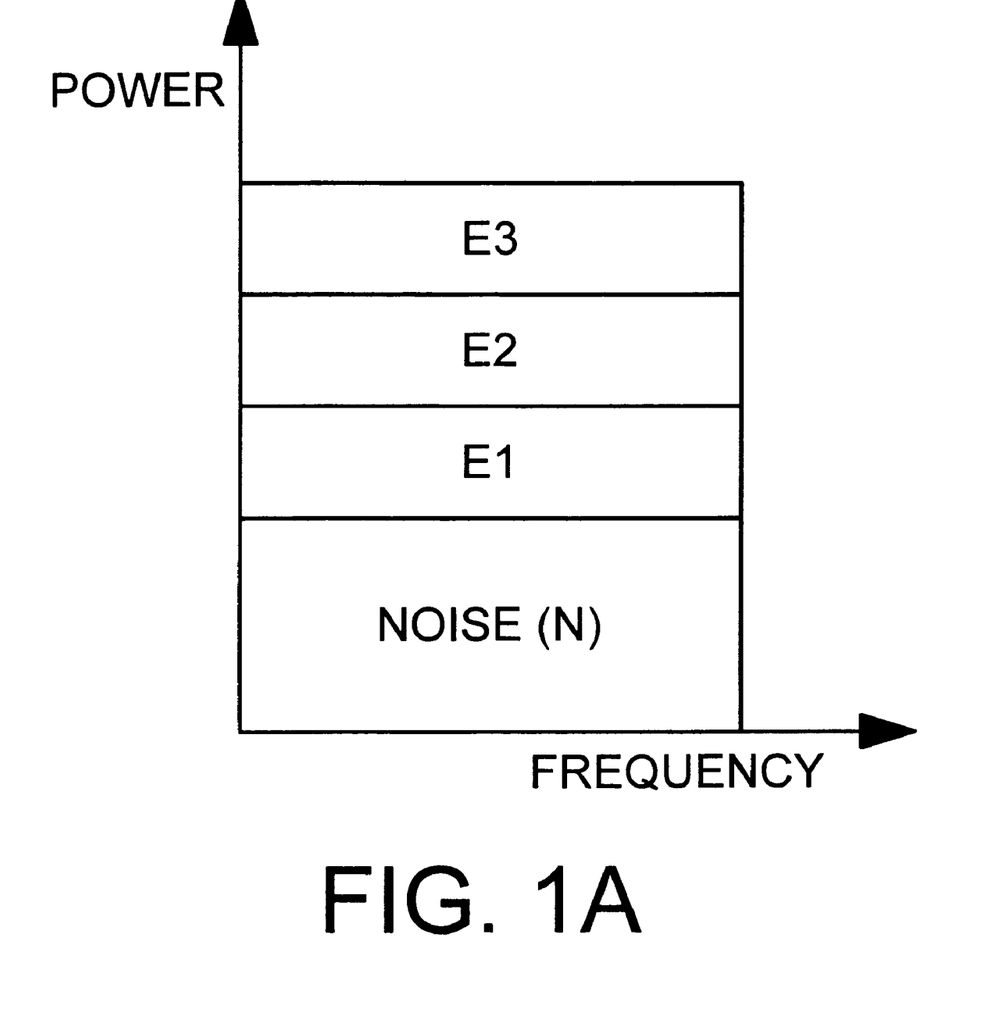
FIG. 1A is a graph of power versus frequency for an exemplary spread spectrum system.

Similar concerns exist in the downlink. To achieve reliable reception of a signal at each remote station, the ratio of the signal to the interference (SIR) should be above a prescribed threshold for each remote station (referred to as a "required signal-to-interference" level, or $SIR_{req}$). For example, as shown in FIG. 1, consider the case where three remote stations receive, respectively, three signals from the common CDMA communication band. Each of the signals has a corresponding energy associated therewith—namely energy levels E1, E2 and E3, respectively. Also, present on the communication band is a certain level of noise (N). For the first remote station to properly receive its intended signal, the ratio between E1 and the aggregate levels of E2, E3 and N must be above the first remote station's required signal-to-interference ratio.

To improve the SIR for a remote station, the energy of the signal is increased to appropriate levels. However, increasing the energy associated with one remote station increases the interference associated with other nearby remote stations. As such, the radio communication system must strike a balance between the requirements of all remote stations sharing the same common channel. A steady state condition is reached when the SIR requirements for all remote stations within a given radio communication system are satisfied. Generally speaking, the balanced steady state may be achieved by transmitting to each remote station using power levels which are neither too high nor too low. Transmitting messages at unnecessarily high levels raises interference experienced at each remote receiver, and limits the number of signals which may be successfully communicated on the common channel (e.g. reduces system capacity).

This technique for controlling transmit power in radiocommunication systems is commonly referred to as a fast power control loop. The initial SIR target is established based upon a desired quality of service (QoS) for a particular connection or service type. For non-orthogonal channels, the actual SIR values experienced by a particular remote station or base station can be expressed as:

$$SIR = \frac{\text{Mean power of received signal}}{\text{Sum of the mean powers of all interfering signals}} \quad (1)$$

The SIR is measured by the receiving party and is used for determining which power control command is sent to the transmitting party.

A slow power control loop can then be used to adjust the SIR target value on an ongoing basis. For example, the remote station can measure the quality of the signals received from the remote station using, for example, known bit error rate (BER) or frame error rate (FER) techniques. Based upon the received signal quality, which may fluctuate during the course of a connection between the base station and a remote station, the slow power control loop can adjust the SIR target that the fast power control loop uses to adjust the base station's transmitted power. Similar techniques can be used to control uplink transmit power.

Figure 1B:
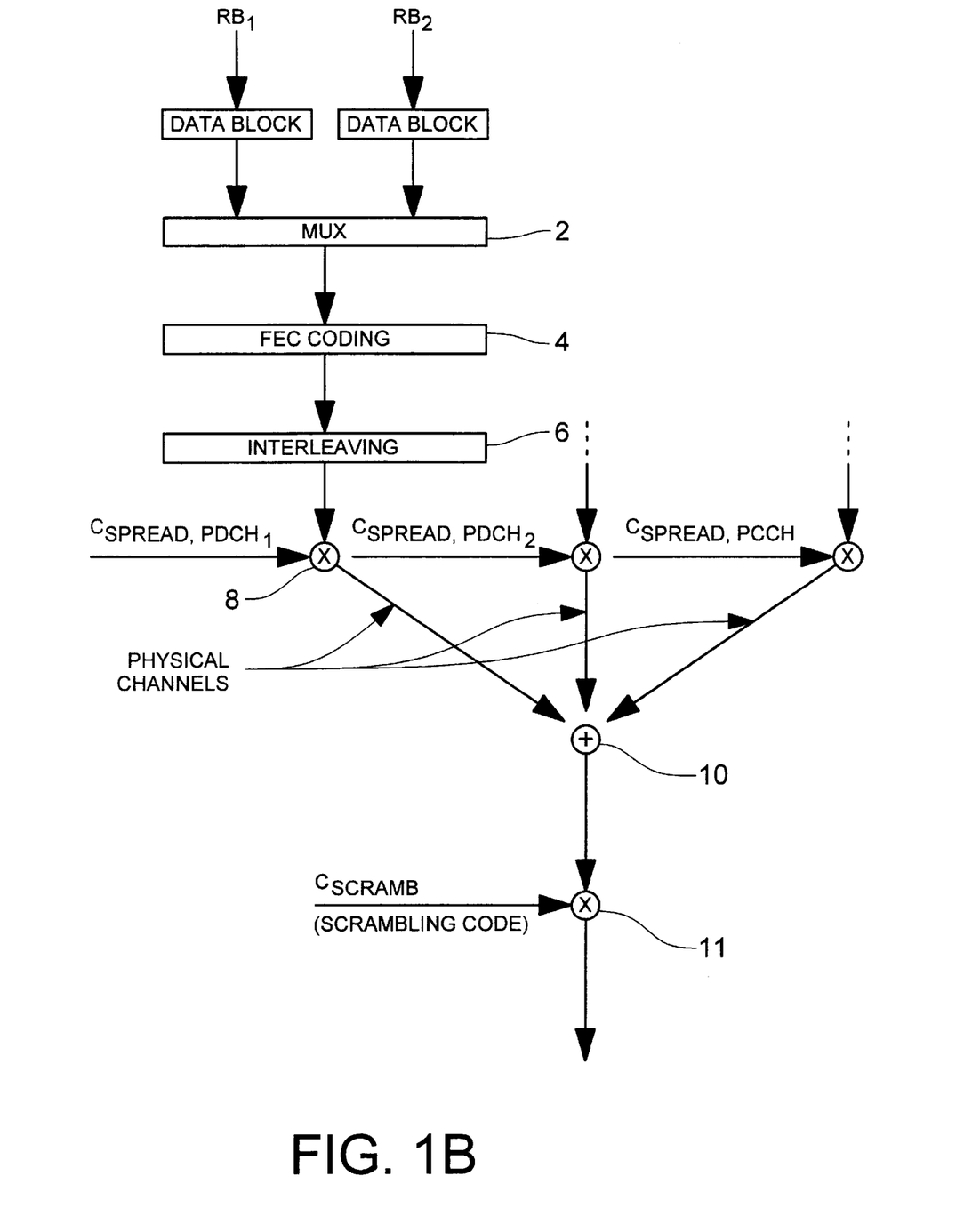
FIG. 1B illustrates the packaging of radio bearers into physical channels.

As radiocommunication becomes more widely accepted, it will be desirable to provide various types of radiocommunication services to meet consumer demand. For example, support for facsimile, e-mail, video, internet access, etc. via radiocommunication systems is envisioned. Moreover, it is expected that users may wish to access different types of services at the same time. For example, a video conference between two users would involve both speech and video support. One technique for handling the different types of data communication involved in these situations is to provide a different radio bearer for each service. A radio bearer provides the capability for information transfer over the radio interface and is characterized by attributes such as information transfer rate (i.e., bit rate or throughput) and delay requirements, etc. A radio bearer carries either user data or control signalling. Typically a bearer is used for a specific service, e.g., speech. A radio bearer may span several physical channels or multiple radio bearers may share a physical channel depending on the bandwidth requirements of each radio bearer. In addition to one or more physical data channels (PDCHs), the user will be allocated a physical control channel (PCCH) on which overhead control information is carried to the user, e.g., bit rate information of the associated PDCHs, transmit power control bits and pilot symbols, at a constant bit rate, which can be used to make the SIR measurements used in the fast power control loop process. One potential relationship between radio bearers and physical channels is illustrated in FIG. 1B. Therein two radio bearers (RB1 and RB2) provide data blocks to multiplexor 2. The selected blocks are provided with forward error correction (FEC) coding 4 and are then interleaved 6 prior to being spread using the spreading code associated with PDCH1 at 8. Similar branches, not completely shown, can be provided for PDCH2 and the PCCH. Each of the resulting physical channels is then summed at block 11 and scrambled at block 10 prior to transmission.

However, the various services, and therefore radio bearers, may have different QoS requirements. Thus, it would be desirable to provide a slow power control loop for each radio bearer (or at least each PDCH) to enable these different QoS requirements to be accounted for during the power control process.

SUMMARY

These and other problems of previous communication systems are solved by Applicants' invention, wherein the transmit powers of the PCCH and PDCHs that are assigned to a specific user are controlled by the same fast control loop, such that the transmit powers on these physical channels are raised or lowered simultaneously in the same direction. On top of the fast control loop, the relative transmit powers of the PCCH and each PDCH are adjusted by a combination of slow power control loops associated with the quality requirements and measured receive quality of the respective radio bearers. The transmit power of the PCCH serves as a reference, while the transmit powers of the PDCHs are defined as offsets (in dB) to the PCCH transmit power. These offsets, as well as the PCCH SIR target, are adjusted by a combination of the different slow control loops.

According to exemplary embodiments of the present invention, a mobile station receives signals over an air interface from the radiocommunication system, i.e., from a base station. These signals include fast power control loop transmit power commands and power offset commands associated with slow power control loop evaluation of the received signal quality at the base station. The mobile station uses these commands to adjust its transmit power on each of its allocated physical channels. The physical data channels are individually adjusted using the offset power commands, while all of the channels are adjusted using the transmit power command of the fast power control loop. At the same time, the mobile station evaluates the signal-to-interference ratio and quality of its received signals to provide analogous transmit power commands and power offset commands to the base station on the uplink. The base station receives these transmit power commands and power offset commands and adjusts its transmit power accordingly.

Various exemplary embodiments are described for implementing slow power control loops according to the present invention. For example, radio bearers which are mapped onto the same physical channel have their measured qualities compared with their quality requirements. If these comparisons indicate that one of the radio bearers needs improved quality, then the result is an output signal indicating that more power is needed for that particular physical channel.

The PCCH can have its SIR target updated in one of several ways. For example, quality of the PCCH can be measured and compared against a required quality. Alternatively, the SIR target can be varied in accordance with the most stringent requirements of the various radio bearers on the physical data channels. That is, if any of the radio bearers need increased quality, then the SIR target can be increased as well.

According to another exemplary embodiment, instead of using a single required quality for comparison with the measured quality of a radio bearer, two thresholds can be used to provide a quality window within which that radio bearer would not request additional transmit power. In this way, if none of the radio bearers associated with a particular physical channel require additional transmit power, then it is not necessary to transmit a power offset command associated with that particular physical channel to the transmitting unit at that measurement interval. In this way, overhead signalling can be reduced to thereby increase data throughput in the system.

BRIEF DESCRIPTION OF THE DRAWINGS

The features and objects of Applicants' invention will be understood by reading this description in conjunction with the drawings, in which.

DETAILED DESCRIPTION

While this description is in the context of cellular communications systems involving portable or mobile radio telephones, it will be understood by those skilled in the art that Applicants' invention may be applied to other communications applications. Moreover, while the invention may be used in CDMA communication systems, it also may be used in other types of communication systems.

Figure 2:
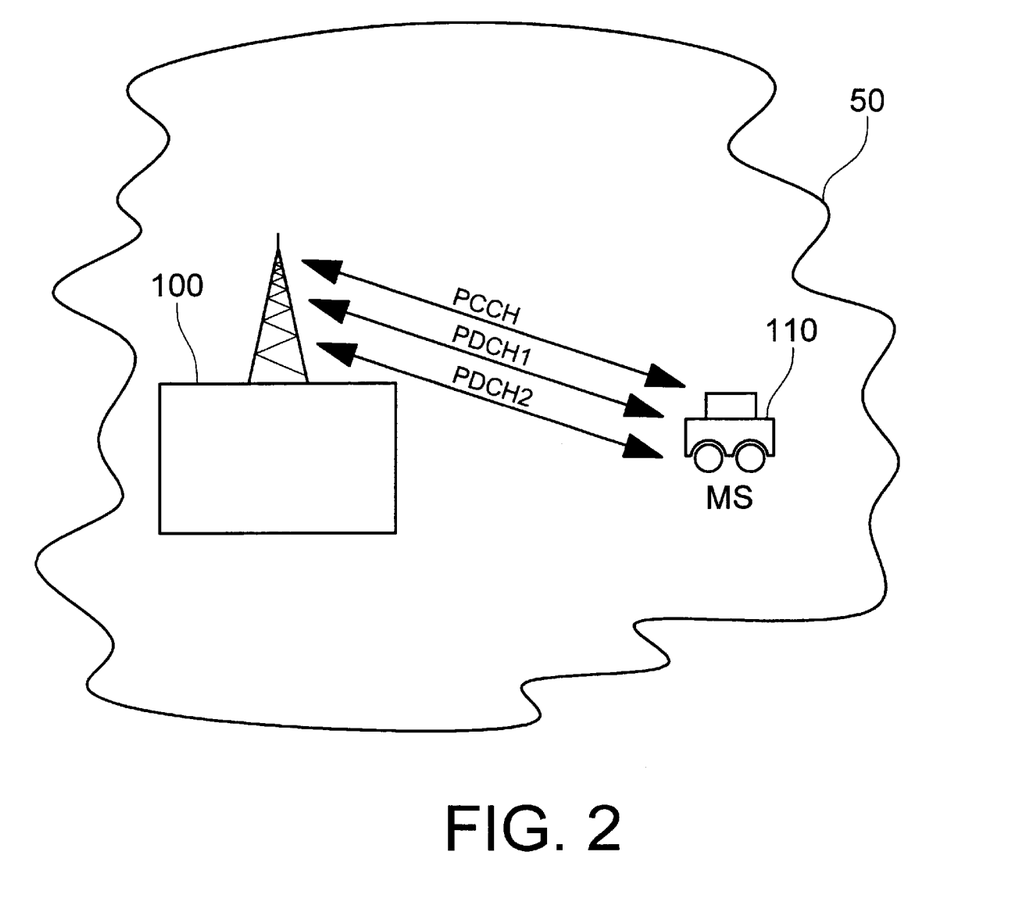
FIG. 2 illustrates a base station and mobile station communicating in a radiocommunication system.

Consider the exemplary cell 50 depicted in FIG. 2. Therein, a base station 100 is currently handling a connection with a mobile station MS 110. Of course, those skilled in the art will appreciate that base station 100 would typically support connections with many mobile stations concurrently, however interaction between a single mobile station and the network is sufficient to illustrate power control techniques according to the present invention. For the purposes of this exemplary embodiment, consider that the system depicted in FIG. 2 operates using a CDMA technology with duplexed downlink (i.e. base-to-mobile direction) and uplink (i.e. mobile-to-base direction) channels. In this example, MS 110 has been allocated three uplink and three downlink physical channels (PCCH, PDCH1 and PDCH2) as indicated by the three bidirectional arrows. Of course, those skilled in the art will appreciate that the physical channels are unidirectional in nature and that a mobile station may have a different number of physical channels allocated to it in the downlink than in the uplink, e.g., for an internet connection wherein more downlink than uplink bandwidth is required.

In the context of this exemplary CDMA system, a physical channel is identified by its code (i.e., short, long or combination thereof), frequency and bandwidth. In the downlink, base station 100 transmits to mobile station MS 110 using a certain power level associated with each of the physical channels. In the uplink, mobile station MS 110 communicates with base station 100 using a certain power level associated with each physical channel. Although not shown, the base station 100 is in communication with a radio network controller (RNC) via a mobile switching center (MSC), which in turn is connected to a public switched telephone network (PSTN).

Figure 3:
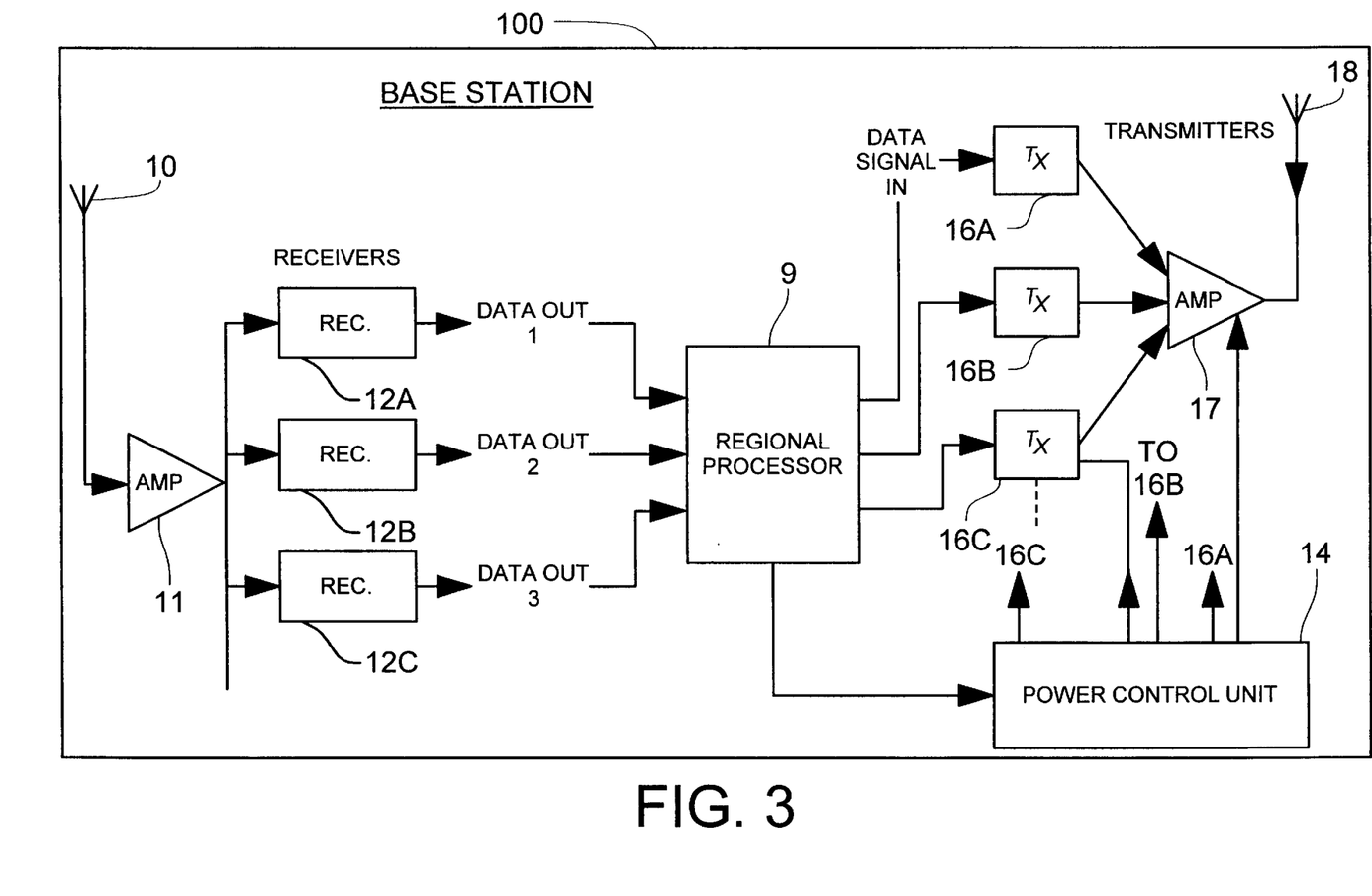
FIG. 3 illustrates an exemplary base station according to an exemplary embodiment of the present invention.

As illustrated in FIG. 3, base station 100 includes a receive antenna for receiving signals from, e.g., MS 110. The received signals can, for example, be amplified at block 11 and processed by each of a plurality of receive signal processing blocks 12, 12b, 12c . . . , only three of which are illustrated for simplicity of the figure. The particular details associated with decoding/demodulating CDMA signals are known to those skilled in the art and, accordingly, will not be further described herein. However, each of the receivers 12a, 12b and 12c could, for example, include correlators associated with the code words corresponding to PCCH, PDCH1 and PDCH2, such that the data transmitted by MS 110 over these physical channels was extracted and provided to regional processor 9 over lines DATA OUT 1, DATA OUT 2 and DATA OUT 3, respectively. In addition to processing the extracted data for other purposes, regional processor 9 receives the transmit power control commands and power offset commands transmitted by MS 110 as a result of the mobile unit's fast and slow power control loops, respectively. The operation of these power control loops according to the present invention is described below with respect to FIG. 5. Thus information is passed from regional processor 9 to power control unit 14, which uses the power control commands and power offset commands to adjust the transmit power of transmitters 16a, 16b and 16c and amplifier 17 as described below.

Regional processor 9 also analyzes the received signals to determine the SIR experienced by base station 100 (e.g., as described in Equation (1)) and to determine a quality measure for the received uplink signals (e.g., BER and/or (FER)). This information is used by the processor 9 to determine appropriate power control and power offset commands which are transmitted to MS 110 over the PCCH.

Figure 4:
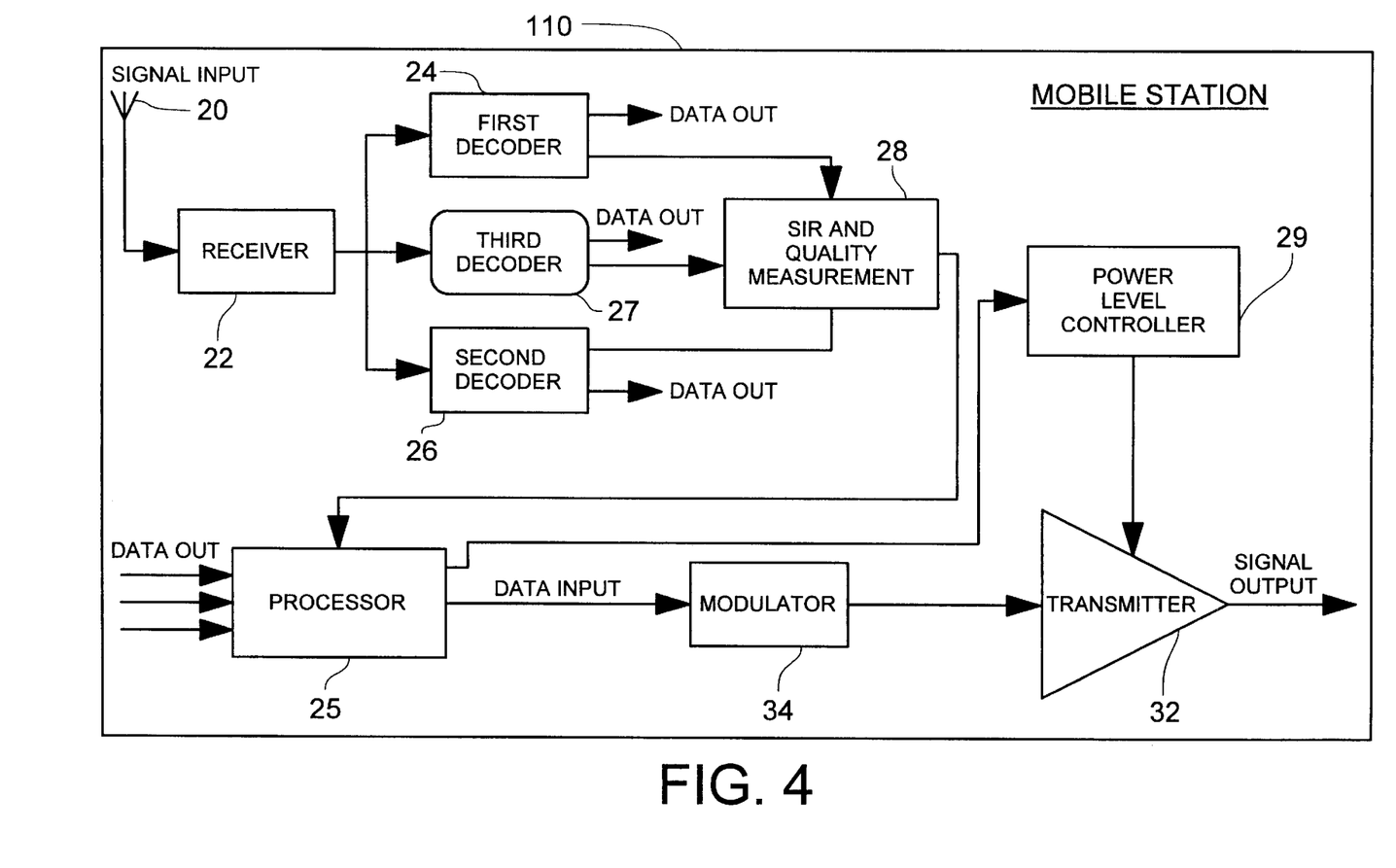
FIG. 4 illustrates an exemplary mobile station according to an exemplary embodiment of the present invention.

According to FIG. 4, an exemplary mobile station 110 is equipped with a receiver 22 which operates in a conventional manner to filter, amplify and demodulate a signal from antenna 20. Similar power control functionality is provided to MS 110 as to base station 100 described above. A first decoder 24 is provided for selectively receiving and decoding its intended signal transmitted from the base station 100, (e.g., that transmitted in the PCCH). Data signals demodulated in the first decoder are generated as output data signals for subsequent use. Likewise signals on other channels assigned to MS 110, e.g., PDCH1 and PDCH2, can be decoded at blocks 26 and 27, respectively. The output data is used by processor 25 in a known manner to reconstruct and output the conveyed information, e.g., to provide the audio and video output of a wirelessly transmitted video conference. At the same time, information obtained during the decoding process can be used to determine the SIR experienced by MS 110 and to perform other quality measurements, e.g., BER and FER calculations. For example, the SIR and quality measurement block 28 can calculate MS 110's SIR as described above in equation (1). The BER and/or FER measurements can be performed using any known technique. The calculated SIR and quality information is supplied to processor 25 by the SIR and quality measurement unit 28. Processor 28 uses the quality measurements to adjust the SIR target value and the power offset values in its slow power control loop as described below. Processor 25 also uses this information to determine which power control command (i.e., "up" or "down") and power offset commands (described below) to include in the messages to be sent on the uplink for use by the base station in its power control unit 14.

Processor 25 also receives the uplink power control commands transmitted by base station 100 and passes those commands to power level controller 29. Modulator 34 receives the uplink information to be transmitted on the PCCH, PDCH1 and PDCH2, modulates the information using any known modulation technique (e.g., QPSK) and passes the modulated data to transmitter 32. The power level at which the different physical channels are transmitted is controlled by power level controller 29 and may vary between channels depending upon the power offset values received from base station 100.

Figure 5:
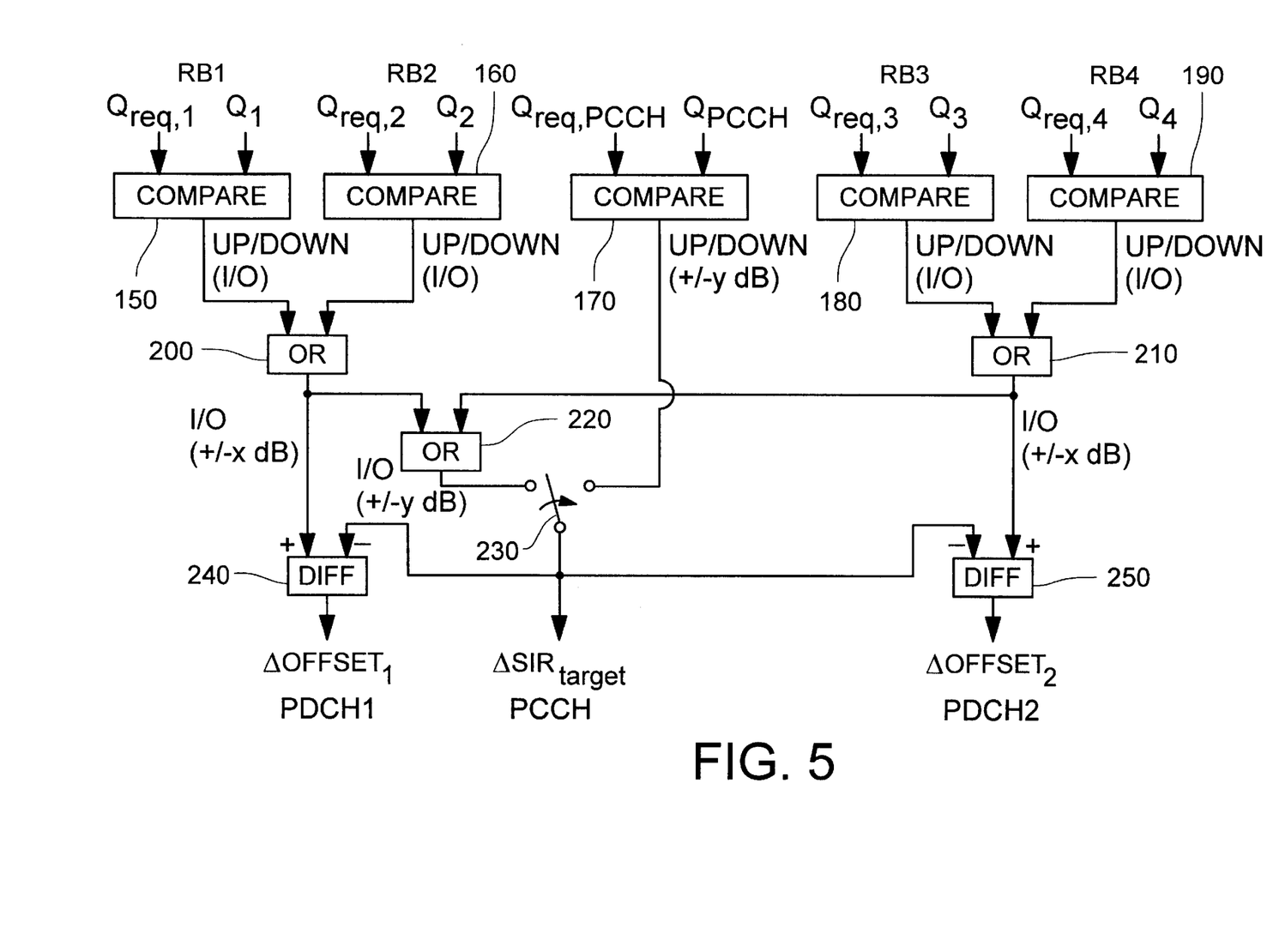
FIG. 5 illustrates the interaction between slow power control loops according to the present invention.

Having described an exemplary base station and mobile station for communicating information over a plurality of physical channels onto which one or more radio bearers can be mapped, and making various signal strength and quality measurements, exemplary techniques for controlling SIR power targets and generating the power control and power offset commands according to the present invention will now be described with respect to FIG. 5. The following applies to both uplink or downlink power control. Therein, the quality ($Q_N$) measured for each radio bearer (RB) that is assigned to MS 110 is applied to an input of one of the comparators 150, 160, 180 and 190. As mentioned earlier, quality can be measured as a function of BER, FER, a combination of BER and FER or any other quality parameter. The measured quality is compared with the QoS requirement ($Q_{req}$) assigned to that radio bearer. If the measured quality is less than the required quality, then the comparator outputs a transmit power "up" command, e.g., a binary 1. If, on the other hand, the measured quality is greater than the required quality, then the comparator outputs a transmit power "down" command, e.g., a binary zero. As can be seen in FIG. 5, radio bearers which are mapped onto a single physical channel are grouped together for the purposes of determining power control. In the example of FIG. 5, RB1 and RB2 are mapped onto PDCH1, while RB3 and RB4 are mapped onto PDCH2. For those radio bearers which are mapped onto the same physical channel, their respective transmit powers cannot easily be changed, e.g., without changing the channel coding.

Thus, for those radio bearers which are mapped onto a common channel, the most stringent power requirement at any given measurement interval is adopted for adjusting the associated power offset of SIR target value. For example, with respect to the branches associated with RB1 and RB2, if at least one of the slow power control loops associated with comparators 150 and 160 indicate that a power up action should be taken on PDCH1, then OR gate 190 will output a binary 1. Similarly, for RB3 and RB4, if either comparators 180 or 190 indicate that additional transmit power is necessary to meet the quality requirements of one of these radio bearers, then OR gate 210 will output a binary 1 indicating that the transmit power should be increased.

According to exemplary embodiments of the present invention, the SIR target can be adjusted in two different ways. First, the quality on the PCCH can be measured and compared with the required quality in comparator 170 in a manner similar to that provided for the PDCHs. Alternatively, the SIR target can be adapted in accordance with the most stringent requirement among the different radio bearers using logical OR gate 220. Switch 230 is provided in FIG. 5 to illustrate the alternative possibilities for adapting the SIR target. The selection of one of these two techniques will depend upon various system design criteria, e.g., the feasibility of performing quality measurements on the control channel.

Although changing the relative transmit powers of radio bearers mapped onto the same physical channel is difficult, the relative transmit powers of radio bearers that are mapped onto different PCDHs, e.g., RB1 and RB3, as well as the relationship between the transmit powers of the PCCH and these PDCHs, can readily be adjusted using the technique illustrated in FIG. 5 by the respective PDCH power offsets. This is accomplished by adjusting the power at which a PDCH is transmitted relative to its associated PCCH using the quality comparisons described above. These offsets will vary over time. For example, the change in transmit power offset for PDCH1 is equal to the difference between the output of OR gate 200 and the change in the SIR target carried on switch 230 as computed at difference block 240. Similarly, the change in the power transmit offset for PDCH2 is computed at block 250 as the difference between the output of OR gate 210 and the signal carried via switch 230. The particular power steps x and y associated with the PDCHs and PCCH, respectively can either be a fixed number of dBs or can be adaptive in some way, e.g., depending upon how much the measured quality differs from the QoS requirement.

All the logic illustrated in FIG. 5 can be located in the receiving unit. However, the changes in transmit power offsets for the PDCHs, i.e., the offsets output by difference blocks 240 and 250, are transmitted to the transmitting unit via the aforedescribed power offset commands. Thus, techniques according to the present invention provide two different slow power control loop for adjusting the SIR target associated with a base or mobile station and a plurality of slow power control loops each associated with a different physical data channel.

Figure 6:
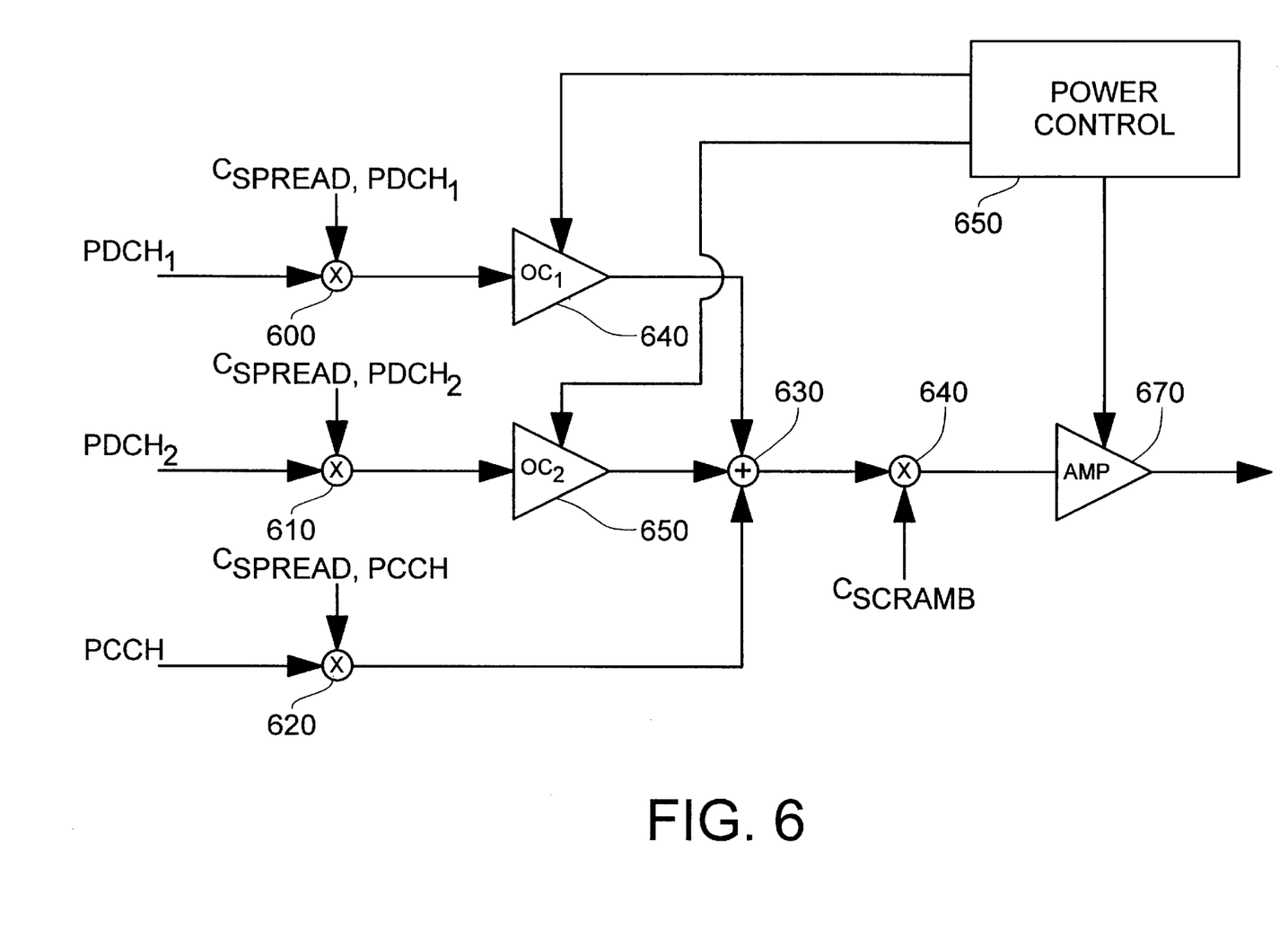
FIG. 6 illustrates an exemplary implementation for adjusting transmit power in accordance with the present invention.

The power offsets determined for each physical data channel can be used to transmit information on those channels at different power levels. An exemplary technique for implementing these power offsets is illustrated in FIG. 6. Therein, each of PDCH1, PDCH2 and PCCH are spread by their unique spreading codes at blocks 600, 610 and 620, respectively. Prior to being summed with the other physical channels (block 630) and scrambled (block 640), PDCH1 is adjusted (amplified) by variable gain amplifier 640. The gain $\alpha_1$ of amplifier 640 is controlled by power control unit 650 (e.g., power control unit 14 of base station 100 or power level controller 29 of MS 110) in accordance with the power offset commands. The transmit power of PDCH2 is offset from that of the PCCH in a similar manner using amplifier 650. Fast power control (i.e., up and down commands) is implemented at amplifier 670 in accordance with the power control commands.

Figure 7:
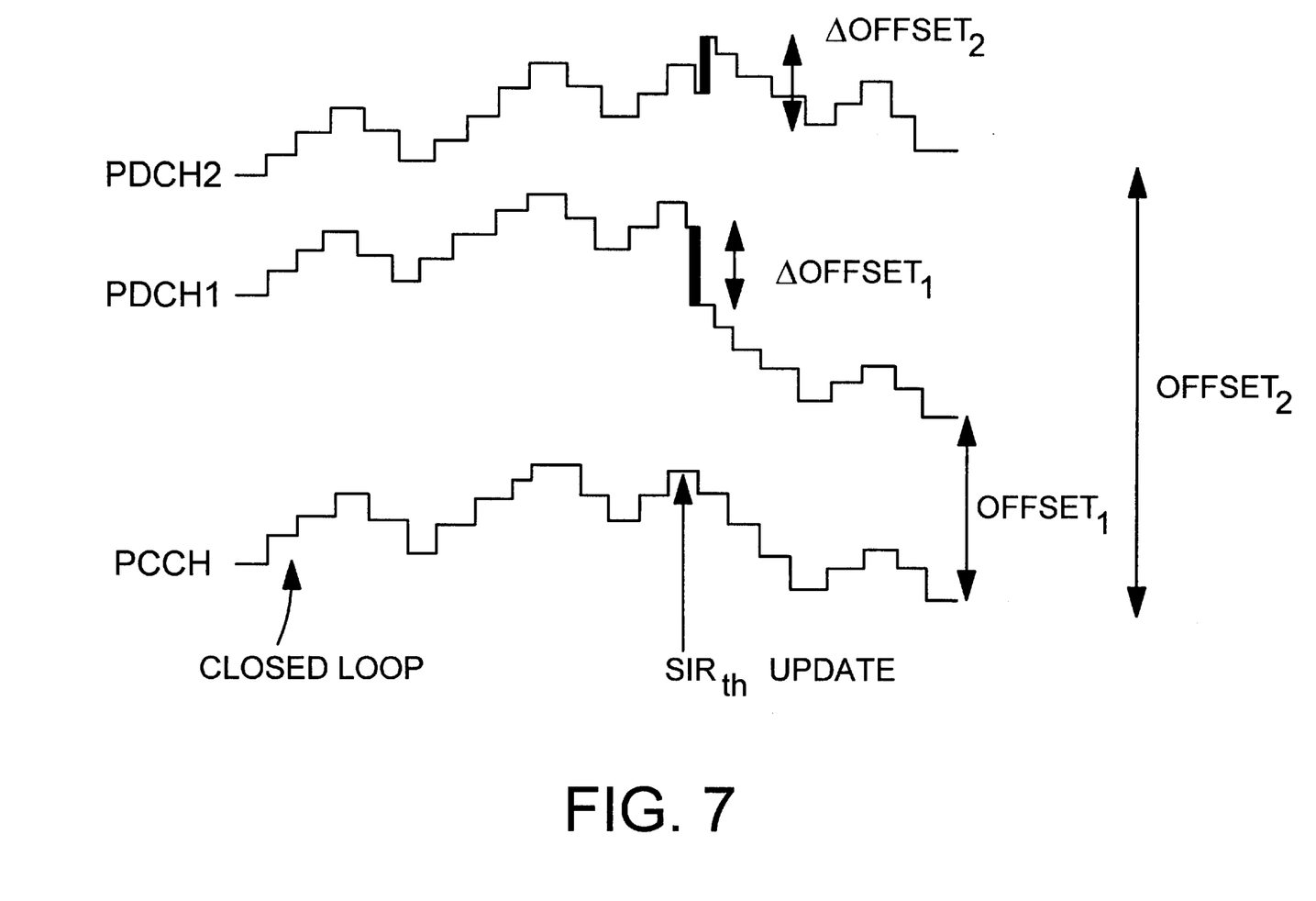
FIG. 7 graphically depicts power control on three physical channels according to the present invention.

FIG. 7 provides a graphical representation of power control on the three associated physical channels described above. In the figure, the fast loop power control provides the same periodic step increases and decreases in transmit power for each of the three physical control channels until a slow power control loop update occurs (shown in FIG. 7 as $SIR_{th}$ update). In the example shown in FIG. 7, this particular slow loop update results in a negative change in the transmit power associated with PDCH1 relative to the PCCH and an increase in the transmit power for PDCH2 relative to the PCCH.

As can be seen from the foregoing, techniques according to the present invention, make it possible to employ individual slow power control on different radio bearers that are assigned to one user, while only having a single fast power control loop per user and transmit direction (up- and downlink). By letting all the PDCHs share the same associated PCCH and employing a common fast power control loop, signaling overhead associated with the transmit power control commands is minimized.

In cellular systems in general, and cellular CDMA systems in particular, it is important that the transmit power for each user is not larger than necessary, in order to minimize the interference to the other users. Different types of services, e.g. speech, video and email, have large differences in QoS requirements and coding schemes. Therefore it is desired that different radio bearers assigned to one user can be power controlled individually. Otherwise, the transmit power would have to be adjusted according to the most stringent quality requirement among the different bearers, resulting in unnecessary high transmit powers for the other bearers. By mapping bearers with differing QoS requirements onto different PDCHs, and letting corresponding slow power control loops adjust the SIR target for the fast power control loop and the relative transmit powers of all PDCHs and the PCCH as proposed herein, the total transmit power and the interference to other users can be lowered. Lower interference spread into the system implicitly raises the system capacity.

The exemplary embodiment of FIG. 5 describes measured quality comparisons with a single threshold ($Q_OS$) to determine whether up or down power control commands are needed for a particular radio bearer or the PCCH. However, according to another exemplary embodiment of the present invention, two thresholds can be used to reduce the signalling associated with transmitting the power offset commands over the air interface. For example, a first and second threshold can be used to create a "window" around the required quality for RB1 in FIG. 5 as:

$$Thresh_1 < Q_{REQ1} < Thresh_2$$

If the measured quality is inside the window established by the two thresholds, then no power adjustment is needed for this particular radio bearer. If the measured quality exceeds $Thresh_2$, then a power down command would generated, and if the measured quality falls below $Thresh_1$, then a power up command would be generated. Thus, the logic of FIG. 5 for this embodiment would include three states, i.e., up, down and no change. Again, the most stringent radio bearer requirement would govern the change in the power offset.

However, for cases where the measured quality for each radio bearer mapped onto a physical channel are within their respective quality windows, and if the transmit power for the PCCH also need not be changed, then the offset can remain the same and no power offset command need be transmitted from the receiving unit to the transmitting unit.

Moreover, although exemplary embodiments of the present invention describe a situation wherein a user is allocated a PCCH, which can be used as a reference channel with respect to which power offset commands can be generated for associated PDCHs, those skilled in the art will appreciate that some systems may not utilize PCCHs in this manner. If a PCCH is not allocated to a user, then any other channel, e.g., one of the PDCHs, can be used as the reference channel.

It will be understood that Applicants' invention is not limited to the particular embodiments described above and that modifications may be made by persons skilled in the art. The scope of Applicants' invention is determined by the following claims, and any and all modifications that fall within that scope are intended to be included therein.

We claim:

1. A method for controlling transmit power in a radiocommunication system comprising the steps of:
    assigning a plurality of physical channels to a user in said radiocommunication system;
    measuring a characteristic of one of said plurality of physical channels which serves as a reference channel;
    controlling transmit power associated with said reference channel based on said measured characteristic; and
    adjusting transmit power of each of the plurality of physical channels other than said reference channel relative to the reference channel transmit power using individual power control loops.

2. The method of claim 1 wherein said reference channel is a physical control channel (PCCH) carrying control information.

3. The method of claims 1 wherein said step of measuring further comprises the step of:
    measuring a signal-to-interference ratio (SIR) of said reference channel.

4. The method of claim 3 wherein said step of controlling transmit power further comprises the step of:
    controlling the transmit power associated with said reference channel based on a comparison of the measured SIR and a target SIR value.

5. The method of claim 4, further comprising the step of:
    adjusting said target SIR value according to quality measurements on the reference channel, where the target SIR value is decreased when the measured quality goes above a first threshold, and the target SIR value is increased when the measured quality falls below a second threshold.

6. The method of claim 5, wherein said target SIR value remains unchanged if said quality measurements are between said first and said second thresholds.

7. The method of claim 4 further comprising the steps of:
    adjusting said target SIR value according to quality measurements on radio bearers that are assigned to the user, where the target SIR value is increased if the measured quality on at least one of the radio bearers falls below a first threshold associated with said at least one of the radio bearers, and the target SIR value is decreased if the measured quality on all radio bearers goes beyond a second threshold specific for each particular radio bearer.

8. The method of claim 1 wherein said step of adjusting transmit power of each of said plurality of physical channels other than said reference channel further comprises the steps of:
    measuring a quality associated with each radio bearer mapped onto one or more of said plurality of physical channels; and
    adjusting a transmit power of each of said plurality of physical channels other than said reference channel relative to the transmit power of said reference channel based on said measured quality.

9. The method of claim 5, wherein said step of adjusting transmit power of each of said plurality of physical channels other than said reference channel further comprises the steps of:
    measuring a quality associated with each radio bearer mapped onto one or more of said plurality of physical channels; and
    adjusting, at each update of said target SIR value, a transmit power of each of said plurality of physical channels other than said reference channel relative to the transmit power of said reference channel based on said measured quality by determining a change in difference between a transmit power of each physical channel other than said reference channel and a transmit power of said reference channel.

10. The method of claim 9, wherein said step of determining a change in difference further comprises the step of:
    setting said difference equal to a difference between x dB and y dB, where:
        x is positive if a measured quality on at least one radio bearer mapped onto a particular physical channel falls below a first threshold associated with said particular radio bearer;
        x is negative if measured quality on all of the radio bearers that are mapped onto said particular physical channel goes beyond a respective second threshold associated with each particular radio bearer; and
        y is the dB change in said target SIR value.

11. The method of claim 6, wherein said step of adjusting transmit power of each of said plurality of physical channels other than said reference channel further comprises the steps of:
    measuring a quality associated with each radio bearer mapped onto one or more of said plurality of physical channels; and
    adjusting, at each update of said target SIR value, a transmit power of each of said plurality of physical channels other than said reference channel relative to the transmit power of said reference channel based on said measured quality by determining a change in difference between a transmit power of each physical channel other than said reference channel and a transmit power of said reference channel.

12. The method of claim 11, wherein said step of determining a change in difference further comprises the step of:
    setting said difference equal to a difference between x dB and y dB, where:
        x is positive if a measured quality on at least one radio bearer mapped onto a particular physical channel falls below a first threshold associated with said particular radio bearer;
        x is negative if measured quality on all of the radio bearers that are mapped onto said particular physical channel goes beyond a respective second threshold associated with each particular radio bearer; and y is the dB change in said target SIR value.

13. A communication station comprising:

a receiving unit for receiving a transmit power control command and at least one power offset command;

a transmitter for transmitting data on a physical control channel and at least one physical data channel; and a power control unit for adjusting a transmit power common to both said physical control channel and said at least one physical data channel using said power control command and for adjusting a relative transmit power between said physical control channel and said at least one physical data channel using said at least one power offset command.

14. The communication station of claim 13, wherein said communication station is a base station.

15. The communication station of claim 13, wherein said communication station is a mobile station.

16. The communication station of claim 13, wherein said transmitter further comprises:

a first spreading unit for spreading data associated with said physical control channel;

a second spreading unit for spreading data associated with said at least one physical data channel;

a variable gain amplifier connected to said second spreading unit for adjusting said relative transmit power; and a summing device for combining an output of said first spreading unit and an output of said variable gain amplifier.

17. The communication station of claim 16, further comprising:

a scrambling unit for scrambling said combined outputs;

a second variable gain amplifier for adjusting said transmit power common to said physical control channel and said at least one physical data channel.

\* \* \* \* \*